United States Patent
Burkhard et al.

[11] Patent Number: 5,884,207
[45] Date of Patent: Mar. 16, 1999

[54] EMERGENCY WHEEL FAST RECOGNITION PROCESS

[75] Inventors: Dieter Burkhard, Burgalben; Manfred Dornseiff, Bromskirchen; Jean-Claude Schwartz, Frankfurt, all of Germany

[73] Assignee: ITT Manufacturing Enterprises Inc., Wilmington, Del.

[21] Appl. No.: 793,477

[22] PCT Filed: Jul. 28, 1995

[86] PCT No.: PCT/EP95/02996

§ 371 Date: Nov. 25, 1997

§ 102(e) Date: Nov. 25, 1997

[87] PCT Pub. No.: WO96/06765

PCT Pub. Date: Mar. 7, 1996

[30] Foreign Application Priority Data

Aug. 27, 1994 [DE] Germany .......................... 44 30 462.5

[51] Int. Cl.$^6$ .................................................. B60T 08/32
[52] U.S. Cl. .............................. 701/76; 701/92; 303/168; 303/173; 180/197
[58] Field of Search .................................. 701/74, 75, 76, 701/92; 303/163, 165, 166, 170, 171, 172, 173, 168, 122.03, DIG. 7; 180/197

[56] References Cited

U.S. PATENT DOCUMENTS

| | | | |
|---|---|---|---|
| 4,961,476 | 10/1990 | Witte et al. | 180/197 |
| 5,299,131 | 3/1994 | Hass et al. | 701/91 |
| 5,309,377 | 5/1994 | Beebe | 364/571.04 |
| 5,415,468 | 5/1995 | Lartarnik et al. | 303/100 |
| 5,802,491 | 9/1998 | Bush et al. | 701/76 |
| 5,803,557 | 9/1998 | Horiuchi et al. | 303/173 |

FOREIGN PATENT DOCUMENTS

| | | |
|---|---|---|
| 0293561 | 12/1988 | European Pat. Off. . |
| 0297527 | 1/1989 | European Pat. Off. . |
| 0508146 | 10/1992 | European Pat. Off. . |
| 0579054 | 1/1994 | European Pat. Off. . |
| 4019886 | 6/1990 | Germany . |
| 3915879 | 11/1990 | Germany . |
| 4016903 | 11/1990 | Germany . |
| 4130370 | 3/1992 | Germany . |
| 4036742 | 5/1992 | Germany . |
| 4112738 | 10/1992 | Germany . |
| 4114047 | 11/1992 | Germany . |
| 4230481 | 3/1994 | Germany . |
| WO 8809923 | 12/1988 | WIPO . |
| WO 8904783 | 6/1989 | WIPO . |
| WO 9606765 | 3/1996 | WIPO . |

OTHER PUBLICATIONS

English Translation of the International Preliminary Examination Report for Application PCT/EP95/02996 28 Jul. 1995.

Search Report of the German Patent Office for Application P4430462.5.

*Primary Examiner*—V. Lissi Mojica
*Attorney, Agent, or Firm*—Rader, Fishman & Grauer PLLC

[57] ABSTRACT

The present invention describes a process for a vehicle including an electronic control system, which processes input signals representative of the rotational behavior of the individual wheels, and wherein the differences of the tire tread circumferences of the individual wheels are determined by way of short-time and long-time correction factors. The long-time correction factors $LZ_n$ are determined from the differences $D_{R1}$ between the short-time correction factors $KZ_{R1}$ and the long-time correction factors $LZ_{R1}$ of the respective wheel by averaging $LM_{r1}$ the differences during a predetermined time interval and by evaluating and weighting the average value. For the quick identification of an emergency wheel, every time the vehicle engine is started, the long-time factor $LZ_{R1}$ is equalled once to the short-time factor $KZ_{R1}$ of the respective wheel, if simultaneously the short-time correction factors of three wheels are approximately equal and the short-time correction factor of the fourth wheel adopts a relatively high value, which is within a predetermined range, for a predetermined time interval or minimum time interval, and if the short-time correction factor of the fourth wheel remains approximately constant during this time interval.

6 Claims, 3 Drawing Sheets

EMERGENCY WHEEL FAST RECOGNITION PROCESS

BACKGROUND OF THE INVENTION

The present invention relates to a process of quick identification of an emergency wheel, for a vehicle including an electronic control system, wherein the rotational behavior of the wheels is sensed by wheel sensors, and wherein the differences of the tire tread circumferences are determined by way of correction factors.

Electronic control systems for automotive vehicles, such as antilock control systems (ABS), traction slip control systems (TCS), systems for the electronic control of brake force distribution (EBV), etc., require (exclusively or among others) data about the rotational behavior of the individual wheels as input quantities. Even minor differences in the tire tread circumferences, caused by manufacturing tolerances, uneven wear, etc., take influence on the control. This applies to a major degree in the case of mounting a so-called emergency wheel which may be smaller or larger than the other wheels.

German patent application No. 39 15 879 teaches calculating a correction factor for each wheel of a vehicle. To compensate for different tire tread circumferences, the measured wheel speed is multiplied by the associated correction factor and made the basis for the further signal processing in the control system.

International application WO89/04783 discloses a process measuring the vehicle speed in time intervals without wheel slip. In this application, correction values are determined from deviations of the wheel speeds from the vehicle speed and, subsequently, the wheel speed of the individual vehicle wheels is corrected by way of the correction values.

German patent application No. 40 36 742 discloses a circuit for a traction slip control system with brake management or engine management which is used to improve the control function when a small spare wheel instead of a driven normal-size wheel is mounted. In this application, the rotational speed measured on the spare wheel is evaluated by a correction factor determined during stable wheel rotational behavior and is thereby conformed to the measured speed value of the second driven wheel of the same axle so that the same slip control threshold as for a normal-size wheel applies to the smaller spare wheel.

It is principally necessary that these correction factors are determined, "learnt" in steps and confirmed by the control unit at the commencement of a control operation. Short-term speed variations may be due to special driving situations, such as cornering, traction torques or brake torques, vibrations, disturbances, etc. Therefore, it takes a relatively long time until a control system of this type can detect an emergency wheel, i.e. a wheel having a noticeably different tire tread circumference, and calculate a corresponding correction value.

SUMMARY OF THE INVENTION

An object of the present invention is to provide a process which permits a relatively quick identification of an emergency wheel and a corresponding adaption of the control to this situation.

It has been found that this object can be achieved by the process described. The special features of the process of the present invention include producing a short-time and a long-time correction factor for each wheel, determining the short-time correction factors from the instantaneous correction factors measured in the working cycle by averaging them during an interval in the order of 30 to 300 msec, determining the long-time correction factors from the differences between the short-time and the long-time correction factors of the respective wheel by averaging them during a time interval in the order of 5 to 30 seconds and by evaluating the average value. In each case, a partial value of the average value is evaluated for adaptation of the long-time correction factor. Further, after a predetermined, recurrent event, in particular after each start of the vehicle engine, the short-time correction factors of the individual wheels are compared, and the long-time correction factors are equalled or approximated one time to the short-time correction factors of the respective wheel, if, simultaneously, the short-time correction factors of three wheels are approximately equal, the short-time correction factor of the fourth wheel adopts a relatively high value, which is within a predetermined range, for a predetermined minimum time interval, and the short-time correction factor of the fourth wheel remains approximately constant during the minimum time interval.

Some particularly favorable embodiments of the present invention are described in the subclaims.

Thus, a direct correction of the long-time correction factors, which otherwise can be learnt only over long periods of time, is achieved by the present invention because the short-time factors of the individual wheels adopt the values defined in claim 1 and this condition is maintained during a defined time interval. The learning process is continued smoothly after this rapid learning step which is permitted only one time after the engine is started.

BRIEF DESCRIPTION OF THE DRAWINGS

Further details of the present invention can be seen in the following description making reference to the accompanying drawings. In the drawings.

DETAILED DESCRIPTION OF THE INVENTION

The present invention is based on a process which makes a difference between long-time and short-time correction factors to determine the correction factors which sense and compensate for the different tire tread circumferences. The long-time correction factor is derived from the differences between short-time and long-time correction factors, by evaluating the difference, and by weighting and averaging the value. This process is described by the following explanations, making reference to FIG. 1.

Figure 1:
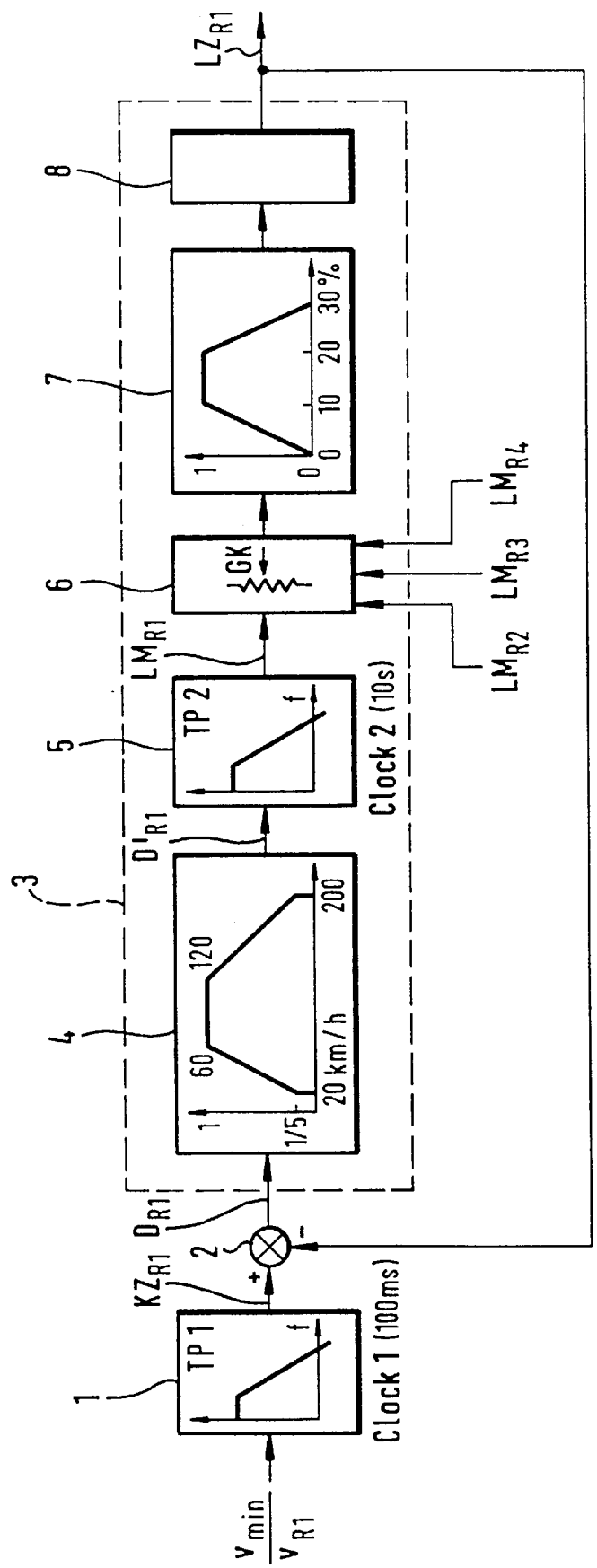
FIG. 1 is a simplified view of a circuit branch for determining the short-time and long-time correction factors of a wheel.

The quotient of the instantaneously lowest wheel speed $v_{min}$ and the speed of the respective wheel (FIG. 1 shows the branch for wheel R1) is produced as an input quantity. An average value which represents the short-time correction factor $KZ_{R1}$ is produced by a digital filter or digital low-pass filter 1 (TP1) in the working cycle of Clock 1, amounting to roughly 100 msec in this case. In the present embodiment, the short-time correction factor is calculated according to the relation $$KZ_{Rn} = \frac{1}{N} \sum_{i=1}^{N} \frac{C * v_{mini}}{v_{Rni}}$$

wherein the individual expressions have the following meaning:

$KZ_{Rn}$ refers to the short-time correction factor of wheel n (n=1 to 4. N=1 in FIG. 1), N is the number of loops or cycles, across which the average value is produced, $v_{min}$ is the instantaneously lowest wheel speed, $v_{Rn}$ is the instantaneous speed of wheel n, C is a constant.

The difference $D_{R1}$ between the long-time correction factor $LZ_{R1}$ and the short-time correction factor $KZ_{R1}$ is produced in a comparator and differentiator 2. Correction values to adapt the long-time correction factor $LZ_{R1}$ are obtained from the difference $D_{R1}$ in a filtering and adapting circuit 3.

The signal $D_{R1}$ representative of the difference between the long-time and short-time correction factors of wheel 1 is initially evaluated by a band pass filter 4 or weighted as a function of the vehicle speed in the embodiment shown. The band pass filter 4 permits passage of the difference signal $D_{R1}$ in its full amount in a medium speed range which is between 60 km/h and 120 km/h in the present case. However, the signal is damped to a very high degree below a bottom speed threshold of 20 km/h and above a top speed threshold of 200 km/h. As is represented in the band pass filter 4, signal damping decreases linearly in the range between 20 km/h and 60 km/h and increases linearly in the range between 120 km/h and 200 km/h.

The output signal $D'_{R1}$ of the band pass filter 4, i.e. the weighted difference signal $D_{R1}$, is further processed in a digital low-pass filter 5 (TP2). A long-time average value is produced $$LM_{R1} = \frac{1}{M} \sum_{i=N}^{N*M} f(D_{R1})_i$$

according to the relation
wherein $LM_{R1}$ is the long-time average value of wheel and equals the average value of the weighted deviation ($D'_{R1}$) of the short-time correction factor from the long-time correction factor of wheel 1, M is the number of the summing intervals N.

In the present embodiment, a long-time average value $LM_{R1}$ is produced in intervals of roughly 10 to 20 seconds in each case.

Only part of the long-time average value $LM_{R1}$ is conducted further due to a damping circuit 6. The amount of this part depends among others on so-called curve-weighting factors GK which are determined and evaluated by the damping circuit 6 in consideration of the long-time average values of the other wheels R2, R3 and R4. An expedient magnitude of the weighting factor GK can be found by a diagonal, sidewise and axlewise comparison of the long-time average values of the individual wheels.

Finally, the adoption of the output signal of the damping circuit 6 for each individual wheel is restricted to the long-time correction factor $LZ_{R1}$ in a following band pass filter 7. To weaken the effect of overspinning of a wheel on the long-time correction factor, the output signal of the damping circuit 6 is taken in its full amount if the signal value ranges between 0 and 10%, the signal is limited to 10% if its value ranges between 10 and 20%, and the signal is taken from 10 to 0% if its value ranges between 20 and 30%. The curve variation indicating the signal adoption is represented in the band pass filter 7.

The output signal of the band pass filter 7 is taken into account in an adapting circuit 8 for the correction of the long-time correction factor $LZ_{R1}$ which is finally returned from the output of the circuit 8 to the comparator and differentiator 2. The long-time correction factor is produced for each wheel in the mode of operation applying to wheel 1 as indicated above.

Figure 2:
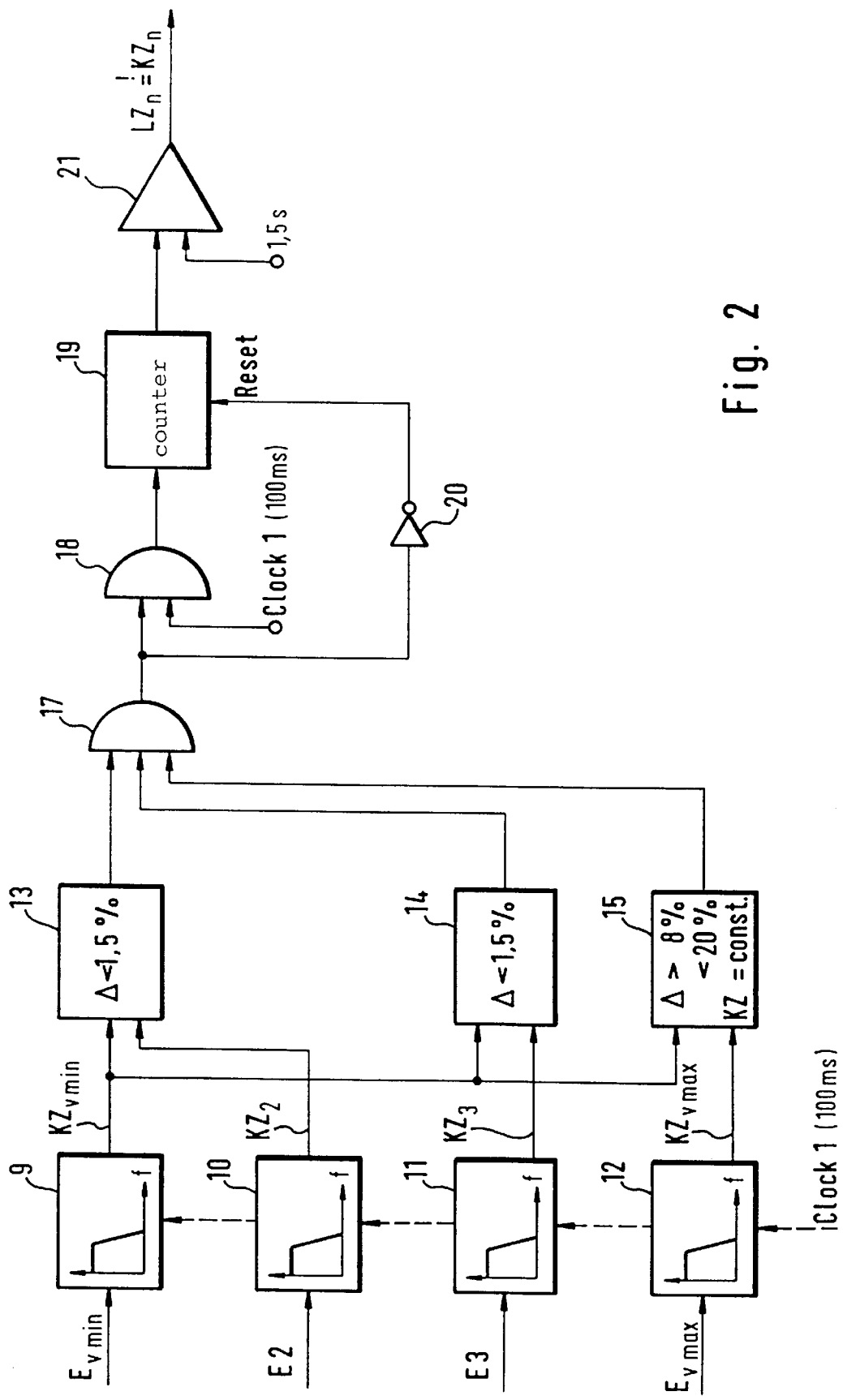
FIG. 2 is a schematically simplified view of an embodiment of a circuit or a program run for implementing the process of the present invention.
Figure 3:
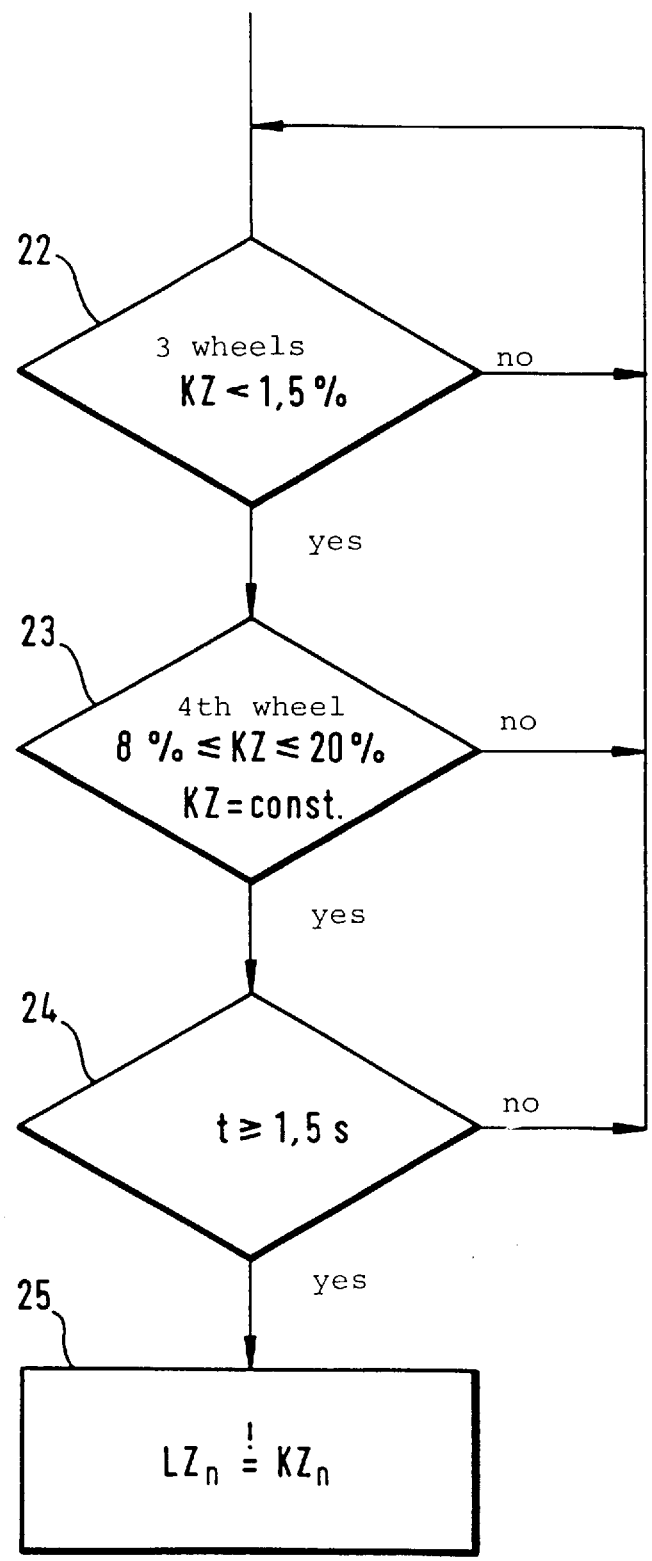
FIG. 3 is a flow chart intended to explain the embodiment of FIG. 2.

FIGS. 2 and 3 show the special characteristics of the process of the present invention. Circuits 9 to 12 represent the digital input filters or low-pass filters (TP1 in FIG. 1). The short-time correction factor $KZ_{Rn}$ prevails at the outputs of the filters. The input signal $E_{min}$ originates from the wheel having the instantaneously lowest speed, and $E_{max}$ originates from the wheel having the highest speed. The input signals of the two other wheels are designated E2 and E3. Clock 1 refers to the working cycle of the averaging operation for the production of the short-time correction factors of the individual wheels. Clock 1 amounts to roughly 100 msec in this arrangement.

Threshold value units 13 and 14 conduct an execution signal (H) as long as the short-time factors $KZ_2$ and $KZ_3$ differ by less than 1.5% from the short-time factor $KZ_{vmin}$ and if, simultaneously, the fourth wheel, i.e. the (smaller) emergency wheel exhibits a short-time correction factor $KZ_{vmax}$ which differs from the short-time correction factor $KZ_{vmin}$ by more than 8%, but less than 20%. The AND condition at the inlet of the AND gate 17 is satisfied in this situation. A counter is triggered in the working cycle (Clock 1; for example, 100 msec) in this case by way of the further AND gate. The counter is reset by way of an inverter 20 and the reset input.

Further, the slip within this band (>8%, <20%) must remain constant, i.e. the slip may vary by ±1.5% at most. The "emergency wheel" counter 19 is counted upward in the working cycle (Clock 1). The counter is reset by the inverter 20 and the reset input with each interruption of the actuation pulse train. As soon as the upward counting operation exceeds a time interval of 1.5 seconds, a comparator 21 issues an output signal, to the end that the long-time correction factors $LZ_n$ are equalled to the short-time correction factor $KZ_n$ in this working cycle. This is done one single time after the drive engine is started. In the following working cycles, the adaptation or correction of the long-time correction factor is continued in the fashion described with respect to the embodiment of FIG. 1.

FIG. 3 is a flow chart which represents the procedure described in the embodiment of FIG. 2 in an extremely simplified manner. If step 22 identifies that the short-time correction factor KZ of three wheels is <1.5%, a check is made in a subsequent step 23 whether the above-mentioned conditions, which apply to the fourth wheel, are also satisfied. If this case applies, which means that the fourth wheel rotates at a relatively high, constant speed, and if this condition is maintained for a time longer than 1.5 seconds (step 24), finally the long-time correction factors are equalled to the short-time correction factors in program step 25.

It is of course possible to link the procedure described with respect to the embodiments of FIGS. 2 and 3 with further conditions.

We claim:

1. Process of quick identification of an emergency wheel, for a vehicle including an electronic control system, wherein the rotational behavior of the wheels is sensed by wheel sensors, and wherein the differences of the tire tread circumferences are determined by way of correction factors wherein

- a short-time correction factor $KZ_{RN}$ and a long-time correction factor $LZ_{Rn}$ is produced for each wheel,
- the short-time correction factors $KZ_{Rn}$ are determined from instantaneous correction factors measured in the working cycle by averaging them during a time interval in the order of 30 to 300 msec,
- the long-time correction factors $LZ_{Rn}$ are determined from the differences $D_{Rn}$ between the short-time and the long-time correction factors of the respective wheel by averaging them during a time interval in the order of 5 to 30 seconds and by evaluating the average value $LM_{Rn}$, and a partial value of the average value is in each case evaluated for adapting the long-time correction factor $LZ_{Rn}$,
- after a predetermined, recurrent event, in particular after each start of the vehicle engine, the short-time correction factors $KZ_{Rn}$ of the individual wheels are compared, and the long-time correction factors $LZ_{Rn}$ are equalled or approximated one time to the short-time correction factors $KZ_{Rn}$ of the respective wheel, if, simultaneously, the short-time correction factors of three wheels $KZ_{vmin}, KZ_2, KZ_3$ are approximately equal,
- the short-time correction factor of the fourth wheel adopts a relatively high value, which is within a predetermined range, for a predetermined minimum time interval t, and
- short-time correction factor $KZ_{vmin}$ of the fourth wheel remains approximately constant during the minimum time interval.

2. Process as claimed in claim 1 wherein the lowest wheel speed $v_{min}$ is divided by the wheel speed of the respective wheel as an input quantity for the calculation of the correction factor, and in that the long-time and short-time correction factors are equalled when the short-time correction factors of three wheels are smaller than 1.5% and the short-time correction factor of the fourth wheel is within a range between 8% and 20% and varies by ±1.5% at most during the predetermined minimum time interval.

3. Process as claimed in claim 1 wherein in that the predetermined minimum time interval t amounts to 1 to 3 seconds, more particularly, to roughly 1.5 seconds.

4. Process as claimed in claim 1 wherein the short-time correction factor $KZ_{Rn}$ is determined by averaging during a time interval in the order of 50 to 200 msec.

5. Process as claimed in claim 1 wherein the short-time correction factor is $$KZ_{Rn} = \frac{1}{N} \sum_{i=1}^{N} \frac{C^* v_{mini}}{v_{Rni}}$$

determined according to the relation
and wherein $KZ_{Rn}$ refers to the short-time correction factor of wheel n (n=1 to 4), N is the number of loops or cycles, across which the average value is produced, $v_{min}$ is the instantaneously lowest wheel speed, $v_{Rn}$ is the instantaneous speed of wheel n, C is a constant.

6. Process as claimed in claim 1 wherein the long-time correction factor $LZ_{Rn}$ is determined by averaging during a time interval in the order of 10 to 20 seconds.

* * * * *